UNITED STATES PATENT OFFICE.

ERNEST L. WEBSTER AND CHARLES E. HAYNES, OF YOUNGSTOWN, OHIO; SAID HAYNES ASSIGNOR TO SAID WEBSTER.

AUTOMOBILE-POLISH.

1,182,516.  Specification of Letters Patent.  Patented May 9, 1916.

No Drawing.  Application filed September 30, 1915.  Serial No. 53,339.

*To all whom it may concern:*

Be it known that we, ERNEST L. WEBSTER and CHARLES E. HAYNES, citizens of the United States, residing at Youngstown, in the county of Mahoning, State of Ohio, have invented certain new and useful Improvements in Automobile-Polishes, of which the following is a specification.

This invention relates to a new and useful composition of matter to be used as an automobile and furniture polish, of which the following is a specification.

The composition consists of the following ingredients, combined in the proportions stated, viz:

| | |
|---|---|
| Bees wax | 1 ounce. |
| Spirits of turpentine | 4 ounces. |
| Oil of citronella | 2 drams. |
| Linseed oil (substantially pure and boiled) | 32 ounces. |

The ingredients of this mixture are combined and taken up in the following order: The bees wax is shaved into fine shreds or leaves. This is then placed in the mixing receptacle. Second: The spirits of turpentine is poured over this and stirred until the two substances so combined form an even paste mixture. Third: Add the linseed oil and thoroughly mix by agitation. Fourth: Add the oil of citronella. This is to be thoroughly mixed by agitation. After it is thoroughly mixed, the composition is strained in order to remove solid matter that may have come into the mixture by impurities of the bees wax. The mixture is then allowed to stand from five to six hours. Before applying it should be slightly shaken.

The above composition is to be used as a furniture or automobile polish and we are not aware of any composition consisting of all the ingredients above disclosed and for the purpose set forth.

We claim:—

1. The herein described composition of matter consisting of bees wax, spirits of turpentine, oil of citronella and linseed oil substantially as described and for the purpose set forth.

2. The herein described composition of matter consisting of 1 ounce of bees wax, 4 ounces of spirits of turpentine, 2 drams of citronella and 32 ounces of linseed oil (substantially pure and boiled) for the purpose set forth.

In testimony whereof, we affix our signatures in presence of two witnesses.

ERNEST L. WEBSTER.
CHARLES E. HAYNES.

Witnesses:
CLINTON J. WALL,
I. G. MATHEWS.